United States Patent [19]

Reinitz

[11] Patent Number: 5,707,879
[45] Date of Patent: Jan. 13, 1998

[54] NEUTRON DETECTOR BASED ON SEMICONDUCTOR MATERIALS

[76] Inventor: Karl Reinitz, 75 Sheridan Rd., Arnold, Md. 21012

[21] Appl. No.: 780,584

[22] Filed: Jan. 8, 1997

[51] Int. Cl.[6] .................. H01L 21/26; H01L 31/0288; H01L 31/115
[52] U.S. Cl. .................. 437/3; 437/24; 437/87; 437/116; 437/136; 437/165; 437/959; 148/DIG. 40; 117/19; 117/41; 117/78; 117/81; 257/429; 250/370.05
[58] Field of Search .................. 437/3, 24, 87, 437/116, 136, 139, 141, 165, 959; 148/DIG. 40, DIG. 79, DIG. 128, DIG. 165; 117/19, 41, 53, 81, 78, 84; 257/429; 250/370.05, 371, 390.01, 391

[56] References Cited

U.S. PATENT DOCUMENTS

| H147 | 11/1986 | Feldman et al. | |
|---|---|---|---|
| 3,542,608 | 11/1970 | Jensen et al. | 257/429 |
| 4,048,508 | 9/1977 | Martin et al. | 250/492 A |
| 4,210,805 | 7/1980 | Kobayashi et al. | 250/370.09 |
| 4,255,659 | 3/1981 | Kaufman | 250/370.09 |
| 4,419,578 | 12/1983 | Kress | 250/390.01 |
| 4,597,165 | 7/1986 | Capasso et al. | 437/24 |
| 5,019,886 | 5/1991 | Sato et al. | 250/370.05 |
| 5,036,202 | 7/1991 | Schulte | 250/370.05 |
| 5,216,249 | 6/1993 | Jones et al. | 250/390.01 |
| 5,281,822 | 1/1994 | Albrecht et al. | 250/370.05 |
| 5,321,269 | 6/1994 | Kitaguchi et al. | 250/370.05 |
| 5,399,863 | 3/1995 | Carron et al. | 250/370.05 |

FOREIGN PATENT DOCUMENTS

| 2273588 | 2/1976 | France . | |
|---|---|---|---|
| 2427646 | 1/1976 | Germany . | |
| 5-102161 | 4/1993 | Japan . | |
| 2166280 | 4/1986 | United Kingdom | 250/370.05 |

*Primary Examiner*—Charles L. Bowers, Jr.
*Assistant Examiner*—Leon Radomsky

[57] ABSTRACT

A neutron radiation detector is described. A semiconductor material is populated with helium three ($^3$He) atoms to increase its overall neutron capture efficiency. Upon capture of a neutron by a $^3$He atom, a tritium ion and a proton are generated with energies of 0.191 and 0.573 MeV, respectively. These energies are deposited in the semiconductor material creating electron-hole pairs. The electron-hole pairs are withdrawn from the material by the application of an electric field and are collected as charges at the terminals. The associated circuitry processes the charges into pulses with these being counted and their sizes measured. The results are recorded and displayed. The number of pulses are a measure of the number of neutrons absorbed in the detector and of the neutron flux of interest. In many instances the detector can also be used to detect and display non-neutron type radiation or simultaneously neutron and non-neutron forms of radiative activity.

2 Claims, 3 Drawing Sheets

NEUTRON DETECTOR BASED ON SEMICONDUCTOR MATERIALS

FIELD OF INVENTION

The present invention relates to a neutron detector with a semiconductor material being used as the detecting medium. Due to a population of this material with helium three ($^3$He) atoms that is uniform or that extends through a substantial part of the detector the neutron detection efficiency of the sensor is extremely high, can be 100%, and surpasses by many orders of magnitude other semiconductor neutron detection methods.

BACKGROUND OF THE INVENTION

Semiconductor radiation detectors are based on collection of electron-hole pairs generated by radiation in a region of the material depleted of charge carriers, usually of electrons and holes. This region, called the depletion region, is created by applying a reverse biased electrical field to a junction previously fabricated in the material. When radiation in the form of neutrons, gamma-rays, X-rays, electrons, protons, etc. are absorbed by the material electron-hole pairs are created. These are withdrawn from the depletion region by the action of the electric field to contacts on the detector surface. These charges give rise to a current that is a measure of the intensity of the radiation flux impinging onto and stopped by the detector.

Gamma-rays, X-rays, electrons, protons, etc. are absorbed by a reasonable thickness of the semiconductor material and for this reason this method can be efficiently used to fabricate detectors for these radiation types. Neutrons, however have a very low collision cross-section with any of the semiconductor material atoms and for this reason currently these materials are not suitable for neutron detection.

In the present invention $^3$He atoms are used to increase the total collision cross-section of the detector material. $^3$He has a collision cross-section for neutrons that is about 1000 times that of the semiconductors. Its cross-section is $5330*10^{-24}$ cm$^2$ (5330 barns) compared to semiconductor materials such as silicon, germanium, etc. that have a neutron collision cross-section of only about 5 barns. For this reason in this invention in order to increase the overall neutron detection efficiency of the semiconductor materials and make them suitable for neutron detection they are populated with $^3$He atoms.

PURPOSE OF THE INVENTION

It is the purpose of this invention to describe a detector that is based on semiconductor materials and on the presently well developed semiconductor detection principles. The detector to be described is compact, rugged, uses little power, is extremely sensitive, can detect neutrons with efficiencies of up to 100%, has a superior energy resolution, has good noise discrimination and is cost effective. The performance, the applicability advantage (small, rugged, uses little power, etc.) and the cost effectiveness of the unit is a substantial improvement over the currently existing state-of-the-art of neutron detection.

DESCRIPTION OF THE FIGURES

The present invention, its advantages and methods of embodiment are more clearly understood when considered together with the accompanying drawings, in which.

BRIEF SUMMARY OF THE INVENTION

The neutron radiation detector is based on semiconductor materials and semiconductor principles. The low neutron collision cross-section of the semiconductor materials is increased by populating them with she atoms that have large neutron collision cross-sections. The resulting detector is efficient, small, rugged (it is of all solids construction without gases in an enclosure under pressure), uses little power and it is suitable for mass production and use due to its simplicity of operation and inherent low cost.

DETAILED DESCRIPTION OF THE INVENTION

1. The Prior Art

Figure 1:
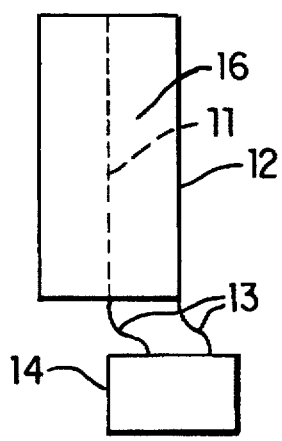
FIG. 1 is a schematic drawing of a $^3$He tube depicting the prior art.

Before describing the current invention in detail the relevant prior art will be reviewed in order to be able to put into perspective the improvements provided by the current invention. The current state-of-the-art of neutron detection is shown in FIG. 1. A tube is filled with $^3$He gas 16 that is as a rule kept under pressure. The detector in its most common embodiment has an inner electrode 11 and an outer shell 12 with an electric field between these components. A neutron, upon interacting with a $^3$He atom produces a tritium ion and a proton. These particles are drawn to their respective electrodes 11 and 12 by the action of the electric field. The charges give rise to a current in the associated electronic circuitry 14 with the current being a measure of the impinging neutron flux. Some of the drawbacks of these detectors are their need to be under pressure of several atmospheres to be efficient, their need of high applied voltages and their electrically noisy operation due to vibration of the structural elements.

2. Description of the Material of the Present Invention

Figure 2:
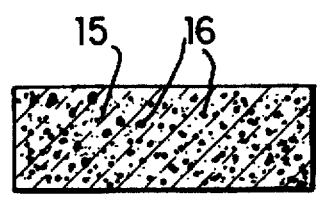
FIG. 2 and 2a are cross-sectional views of the semiconductor base material that is uniformly populated with $^3$He.
Figure 2A:
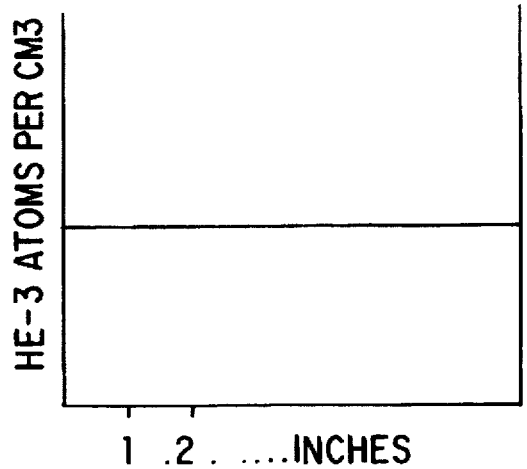
Figure 3:
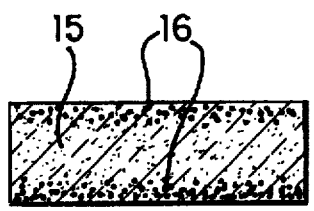
FIG. 3 and 3a are cross-sectional views of the semiconductor base material a substantial portion of which is populated with $^3$He.
Figure 3A:
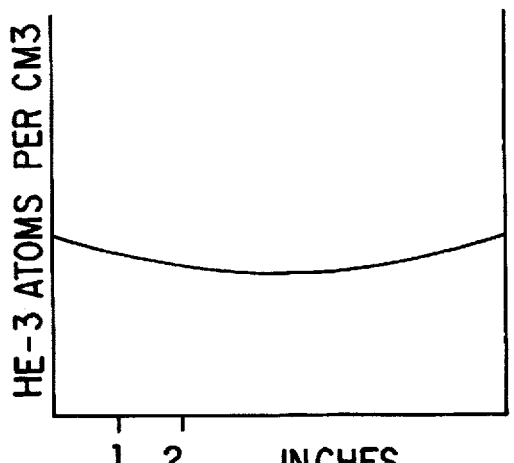

In the present invention a semiconductor slab 15 (FIG. 2 and 3), a material of coaxial configuration or other material shape is populated with $^3$He 16 in such a manner that the distribution of the $^3$He is either uniform throughout the material (FIGS. 2 and 2a) or extends deep into the material occupying a substantial portion of the substrate volume (FIG. 3 and 3a). FIGS. 2 and 2a and 3 and 3a show the distributions of $^3$He 16 in the slabs 15 of the semiconducting material. In these cases the volume populated by $^3$He is the whole or a substantial part of the material and not just a thin surface film on top of the substrate.

As a result of the $^3$He distributions that extend through all or most of the volume the number of $^3$He atoms that can be incorporated into the solid is larger by many orders of magnitude than would be possible, if the population would be restricted to only a thin layer on the surface. Deep distributions allow at least $2*10^{20}$ atoms per cm$^2$ of the surface to be incorporated into the substrate, a population that can result in 100% efficient neutron detectors. This efficiency needs to be contrasted with other suggested methods where the depth of penetration is only about 0.1 micron and the maximum number of $^3$He atoms that can be incorporated into the material per cm$^2$ of the surface is only about $2*10^{16}$. This low population limitation would result in neutron detectors that could at most be 0.01% efficient and will not be sensitive.

The shape of the material can be other than a slab, it can be coaxial, spherical or other desired shape that is appropriate for the design. Using any practical detector thickness the deep incorporation method can always provide the required populations of $^3$He to obtain the efficiency specified by the design regardless of the degree of the efficiency needed.

The detector material can be an element such as silicon or germanium, etc., a compound semiconductor, such as cadmium telluride, mercuric iodide, or other. As to the form of the material, it can be a single crystal, it can be polycrystalline, or it can be in an alloyed or amorphous form.

Figure 4:
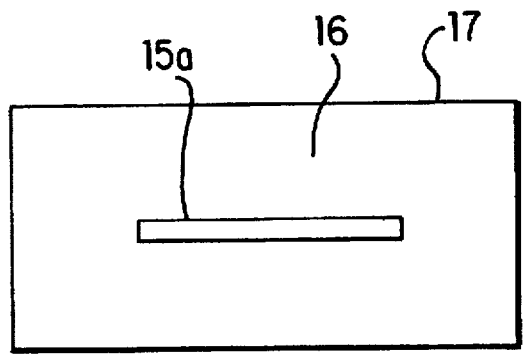
FIG. 4 is the schematic view of the apparatus used to diffuse the semiconductor slab with $^3$He.
Figure 5:
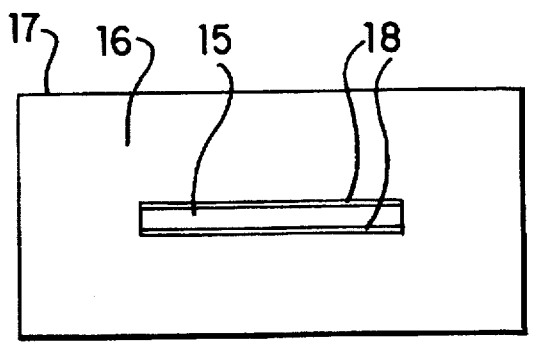
FIG. 5 is the schematic view of the apparatus used to drift the semiconductor slab with $^3$He.

3. Description of the Material Preparation $^3$He 16 can be incorporated into the material by:

a, diffusion (FIG. 4) with the semiconductor substrate 15a, being at an elevated temperature and possibly under pressure in a $^3$He 16 atmosphere or in a mixture of gases containing $^3$He, all enclosed in the enclosure 17;

b, drifting (FIG. 5) $^3$He 16 in the semiconductor slab 15 with the help of an electric field administered by two contacts 18 in a $^3$He 16 atmosphere or in a mixture of gases containing $^3$He under pressure, all enclosed in the enclosure 17;

c, or by a combination of both of the above methods, that is by diffusion and drifting at the same time.

The incorporation could also be accomplished by depositing $^3$He into and/or onto the surface layer(s) of the material by ion implantation, plasma type deposition or by other surface and/or near surface deposition means and annealing, diffusing and/or drifting the material to obtain the desired uniform or deep distribution profiles shown in FIGS. 2a and 3a.

The uniform (FIG. 2a) or other distribution profile (FIG. 3a) of $^3$He is facilitated by the low diffusion constant of $^3$He in the materials of interest with the consequence that the diffusion and/or drift time requirements are relatively short and take place at relatively low temperatures.

Figure 6:
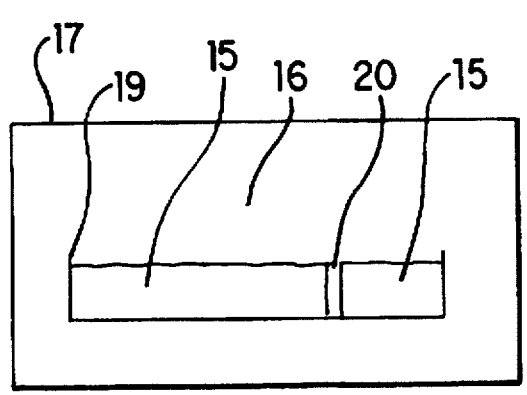
FIG. 6 is the schematic view of the zone refining apparatus containing $^3$He that can be used to obtain $^3$He populated semiconductor base material.
Figure 6A:
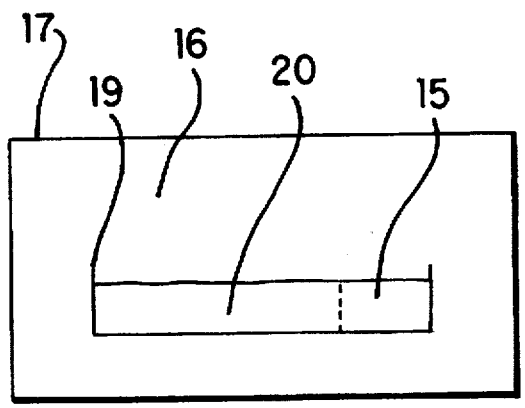
FIG. 6a is the schematic view of the Bridgman type crystal growing apparatus containing $^3$He that can be used to obtain $^3$He populated semiconductor base material.
Figure 7:
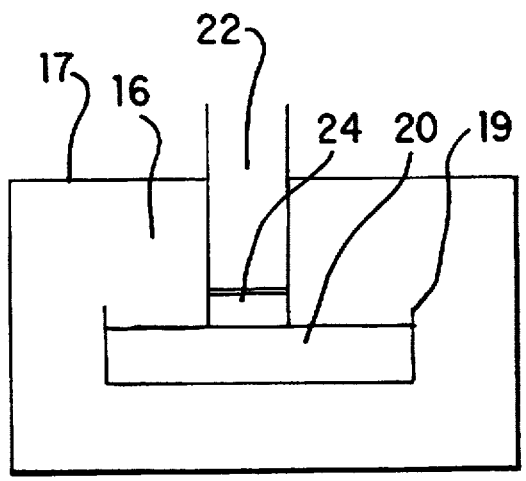
FIG. 7 is the schematic view of the Czochralski type crystal growing apparatus containing $^3$He that can be used to obtain $^3$He populated semiconductor base material.
Figure 8:
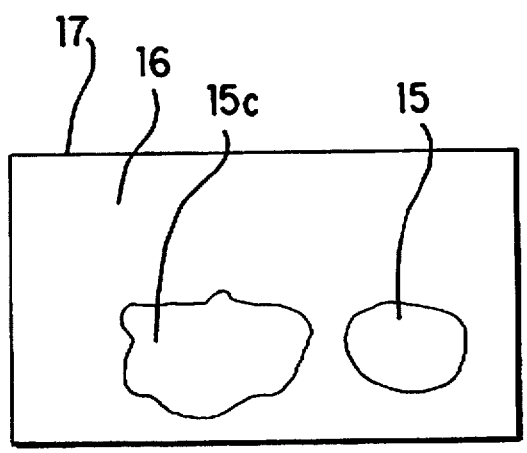
FIG. 8 is the schematic view of the vapor (ampule) type crystal growing apparatus containing $^3$He that can be used to obtain $^3$He populated semiconductor base material.

$^3$He incorporation could in some instances be also taking place during zone refining (FIG. 6) or crystal growth possibly under pressure using the Bridgman (FIG. 6a), Czochralski (FIG. 7) or the vapor (ampule) (FIG. 8) crystal growing methods. These approaches could be effective in controlling $^3$He concentrations in materials especially at low temperatures.

The zone refining method (FIG. 6) is used to purify materials. The crystal 15 is contained in a crucible 19 and is melted throughout a narrow zone 20 using a circular (or other) heater. The molten zone 20 traverses the crystal 15 several times with the direction of travel always in one direction. Using this method the impurities are segregated into the ends of the crystal decreasing the impurity content in the main body of the material 15. Zone refining in a $^3$He 16 atmosphere or in a mixture of gases containing $^3$He, all enclosed in the enclosure 17 will leave the solidified crystal populated with $^3$He.

The Bridgman type crystal growing arrangement (FIG. 6a) consists of a chamber 17 that is pressurized with $^3$He 16 or with a gas mixture containing $^3$He. The polycrystalline ingot is loaded into the supporting crucible 19 and is melted 20. Following the material is slowly cooled with the cooling starting at one of the ends of the melt 20. As the melt 20 slowly solidifies it becomes a single crystal 15. The presence of $^3$He 16 in the growth atmosphere will cause the solidified crystalline material to contain a certain percentage of $^3$He.

The Czochralski type crystal growing arrangement (FIG. 7) consists of a crucible 19 containing molten semiconducting material 20. A seed 24 is dipped into the melt and is slowly withdrawn by the pull rod 22. As the molten material cools it follows the crystalline orientation of the single crystal seed 24. The growth is taking place in a $^3$He 16 or partial $^3$He atmosphere contained in the enclosure 17. Due to the $^3$He in the growth atmosphere some of the $^3$He will be incorporated into the single crystal and will provide the $^3$He population in the eventual detector substrate.

The vapor or ampule growth method (FIG. 8) uses a semiconductor material 15c usually not in a crystalline form contained in an enclosure 17 with the material being transported by a gas or vapor from a hotter into a somewhat cooler region of the enclosure 17. At the cooler region of the enclosure the semiconducting material separates from the carrier medium, deposits and gives rise to crystalline material 15. Due to the presence of $^3$He 16 and possibly other gases under pressure in the enclosure 17 the crystal 15 will become populated with $^3$He. This method of populating the substrate is especially suitable for crystals that grow well from vapor such as mercuric iodide.

4. The Detection Process of the Current Invention

Figure 9:
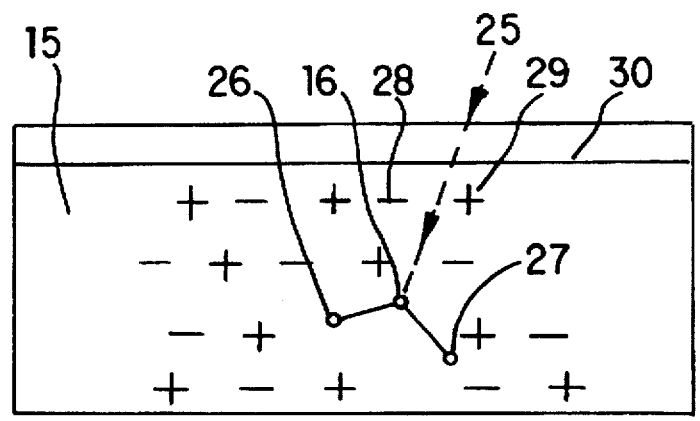
FIG. 9 illustrates the principle of electron-hole pair generation by an incoming neutron.
Figure 10:
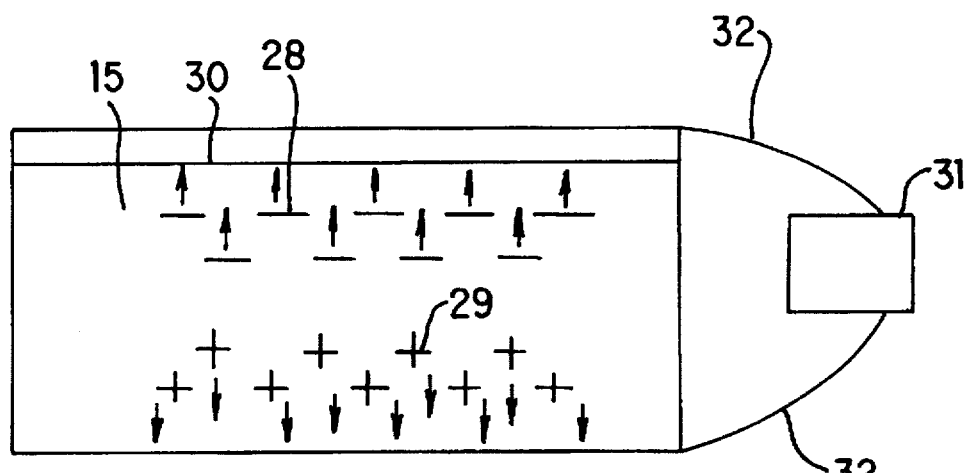
FIG. 10 illustrates the principle of pulse generation due to electrons and holes.

When a $^3$He atom 16 residing in the substrate captures a neutron 25 a tritium ion 26 and a proton 27 (FIG. 9) are generated that have energies of 0.191 and 0.573 MeV, respectively. These energetic particles deposit their energy in the host substrate 15, that has a previously fabricated junction 30 in it, and give rise to electron 28-hole 29 pairs (FIG. 9). The number of the electron 28-hole 29 pairs for a specific amount of deposited energy is in a narrow range that is mainly defined by statistical considerations. The generated electron 8-hole 29 pairs are withdrawn from the material 15 by the application of a reverse biased electric field over the P-N or Schottky junction 30 (FIG. 10). Charge sensitive (or other) amplifiers 31 convert the charges, delivered by the signal leads 32, to pulses. The height of the pulses corresponds to the energy generated and deposited in the material due to the action of a single neutron. The number of pulses generated are a measure of the neutron flux of interest.

Figure 11:
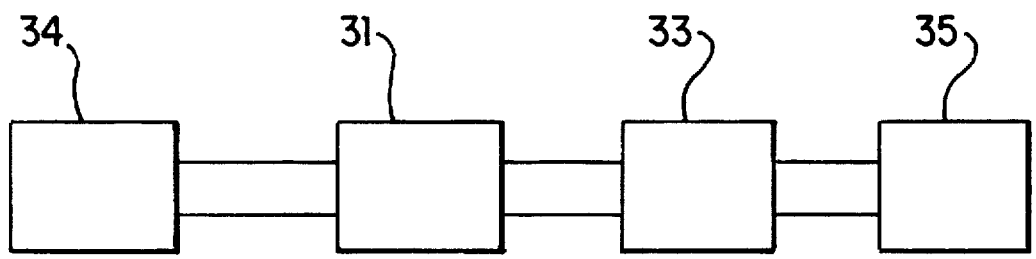
FIG. 11 illustrates a system showing the combined use of a semiconductor neutron detector 34, amplifier 31, multichannel pulse height analyzer 33 and display circuitry 35 to obtain increased resolution and sensitivity.

The charges generated in the detector 34 are amplified 31, sorted and measured by a multichannel pulse height analyzer 33 (FIG. 11). The results are recorded and displayed by the associated memory and display circuitry 35. The ability of the multichannel pulse height analyzer to provide for a display of the frequency of pulse occurrence versus pulse height even in an electrically noisy environment is useful for identification of the energy deposited in the detector. The combined use of the semiconductor neutron detector and of the multichannel pulse height analyzer provide detection sensitivity and resolution that is a significant improvement over the currently existing state-of-the-art of neutron detection.

The detector 34, amplifier 31, pulse height analyzer 33 and display circuitry 35 (FIG. 11) as configured for neutron detection can be also used to detect other forms of radiation besides neutrons, such as X-rays, gamma-rays, electrons, protons, alpha particles, etc. The system prepared for neutron detection will also provide non-neutron radiation spectra simultaneously or in turn with the neutron data. A neutron detector based on a germanium substrate for example can be used possibly in a cooled state to provide simultaneously both neutron and gamma-ray information on the target species. This combined capability is a significant advancement over the current state-of-the-art in detection, identification and quantification of species. Instruments based on this combined capability will detect and quantify target species more accurately and quicker than presently possible with currently available equipment.

Materials such as for example silicon and germanium single crystals can be obtained with a sufficiently high resistivity to be fully depleted. As a result the whole volume of the substrate material can be sensitive to neutrons. When populated with a sufficiently heavy uniform or deep $^3$He doping distribution these fully depleted detectors are opaque to neutrons and serve as 100% efficient neutron detectors. The detectors together with the required pulse processing and memory electronics and an attendant battery can be sufficiently small to serve as monitoring badges for personnel exposed to radiation hazard.

The claims of the invention are:

1. A neutron radiation detector based on semiconductor material populated with $^3$He in such away that:
   the semiconductor material is uniformly populated with $^3$He throughout its body in order to make neutron detection possible with efficiencies of up to 100% or
   the semiconductor material is populated with $^3$He throughout a substantial portion of its body in order to make neutron detection possible with efficiencies of up to 100%.

2. A method of populating a semiconductor material with $^3$He to obtain efficient radiation detectors:
   by diffusing $^3$He into the semiconductor material under $^3$He pressure or in a gas mixture containing $^3$He under pressure or
   by drifting $^3$He in the semiconductor material under $^3$He pressure or in a gas mixture containing $^3$He under pressure or
   by diffusing and at the same time drifting $^3$He in the semiconductor material under $^3$He pressure or in a gas mixture containing $^3$He under pressure or
   by zone refining the semiconductor material in a $^3$He atmosphere under pressure or in a gas mixture containing $^3$He under pressure or
   by growing the semiconductor material using a Bridgman crystal growing apparatus with the growing atmosphere being $^3$He under pressure or a gas mixture containing $^3$He under pressure or
   by growing the semiconductor material using a Czochralski crystal growing apparatus with the growing atmosphere being $^3$He under pressure or a gas mixture containing $^3$He under pressure or
   by growing the semiconductor material using a vapor ampule crystal growing apparatus with the growing atmosphere being $^3$He under pressure or a gas mixture containing $^3$He under pressure.

* * * * *